(12) United States Patent
Kuentzel et al.

(10) Patent No.: US 10,457,381 B2
(45) Date of Patent: Oct. 29, 2019

(54) TORQUE-SENSITIVE LOCKING AND RELEASE MECHANISM FOR A BISTABLE PITCH PROPELLER

(71) Applicant: Kitty Hawk Corporation, Mountain View, CA (US)

(72) Inventors: Steffen Kuentzel, San Francisco, CA (US); Damon Vander Lind, Oakland, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 220 days.

(21) Appl. No.: 15/714,595

(22) Filed: Sep. 25, 2017

(65) Prior Publication Data

US 2018/0265182 A1 Sep. 20, 2018

Related U.S. Application Data

(63) Continuation of application No. 15/463,989, filed on Mar. 20, 2017, now Pat. No. 9,809,300.

(51) Int. Cl.
| | |
|---|---|
| *B64C 11/34* | (2006.01) |
| *B64C 29/00* | (2006.01) |
| *B64C 11/32* | (2006.01) |
| *F04D 29/36* | (2006.01) |
| *F04D 15/00* | (2006.01) |
| *B63H 3/00* | (2006.01) |

(Continued)

(52) U.S. Cl.
CPC ............. *B64C 11/343* (2013.01); *B63H 1/06* (2013.01); *B63H 3/002* (2013.01); *B64C 11/325* (2013.01); *B64C 29/0033* (2013.01); *F04D 15/0055* (2013.01); *F04D 29/366* (2013.01); *F16D 7/005* (2013.01); *F16D 7/08* (2013.01); *F16D 15/00* (2013.01); *F16D 43/206* (2013.01); *F05D 2260/77* (2013.01); *F05D 2260/78* (2013.01)

(58) Field of Classification Search
CPC ..... B64C 11/34; B64C 11/343; B64C 11/325; B64C 27/72; F04D 29/364; F16D 7/005; F16D 7/08; F16D 15/00; F05D 2260/77; F05D 2260/79

See application file for complete search history.

(56) References Cited

U.S. PATENT DOCUMENTS

| | | | | |
|---|---|---|---|---|
| 1,879,935 A | * | 9/1932 | Hill | ........................ B64C 11/343 416/136 |
| 1,931,710 A | * | 10/1933 | Smith | .................... B64C 11/343 416/136 |

(Continued)

*Primary Examiner* — Ninh H. Nguyen
(74) *Attorney, Agent, or Firm* — Van Pelt, Yi & James LLP (57) ABSTRACT

A bistable pitch propeller includes a ball, a spring, and a clutch module where the clutch module has a range of rotational movement between a locked end position and a released end position. The clutch module includes a detent, where the ball sits inside and outside of the detent when the clutch module is in the locked end position and released end position, respectively. In response to an input torque and a spring force from the spring, the clutch module rotates toward the released end position and the locked end position, respectively. The bistable pitch propeller also includes an aircraft blade where the aircraft blade is at the first pitch angle and the second pitch angle when the clutch module is in the locked end position and the released end position, respectively.

6 Claims, 12 Drawing Sheets

(51) Int. Cl.
*B63H 1/06* (2006.01)
*F16D 7/08* (2006.01)
*F16D 43/206* (2006.01)
*F16D 7/00* (2006.01)
*F16D 15/00* (2006.01)

(56) References Cited

U.S. PATENT DOCUMENTS

| | | | |
|---|---|---|---|
| 2,037,251 A | | 4/1936 | Mansson |
| 2,282,077 A | * | 5/1942 | Moore .................. B64C 11/343 |
| | | | 416/89 |
| 2,292,147 A | * | 8/1942 | Miller .................. B64C 11/343 |
| | | | 416/133 |
| 3,099,321 A | | 7/1963 | Watts |
| 3,338,313 A | | 8/1967 | Tolley |
| 5,810,561 A | | 9/1998 | Cossette |
| 2016/0009373 A1 | | 1/2016 | Kondor |

* cited by examiner

TORQUE-SENSITIVE LOCKING AND RELEASE MECHANISM FOR A BISTABLE PITCH PROPELLER

CROSS REFERENCE TO OTHER APPLICATIONS

This application is a continuation of co-pending U.S. patent application Ser. No. 15/463,989 entitled TORQUE-SENSITIVE LOCKING AND RELEASE MECHANISM FOR A BISTABLE PITCH PROPELLER filed Mar. 20, 2017 which is incorporated herein by reference for all purposes.

BACKGROUND OF THE INVENTION

A bistable pitch propeller is able to switch between a first pitch angle and a second pitch angle where the terms "pitch position" and "blade position" are sometimes used in place of the term "pitch angle". Some other types of propellers with multiple and/or adjustable pitch angles use active control mechanisms (e.g., hydraulic systems) to adjust the pitch angle. However, active control mechanisms are expensive and/or heavy, which makes such propellers unattractive for some applications.

In contrast, a bistable pitch propeller passively switches between two pitch angles by rotating the bistable pitch propeller faster or slower using a propulsion motor. Current bistable pitch propellers include mechanisms which change pitch angles when the bistable pitch propeller rotates at certain rotations per minute (RPM). However, having the switching mechanism be sensitive to RPMs (e.g., as opposed to some other metric or unit) is undesirable because the bistable pitch propeller needs to stay out of the RPM "switching range" in order to hold the current pitch angle. Conversely, to change the pitch angle, the bistable pitch propeller may need to be sped up or slowed down in order to be in the RPM "switching range." This may interrupt natural or organic flying of the aircraft. New mechanisms which permit a bistable pitch propeller to switch pitch angles in a more desirable and/or organic manner would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
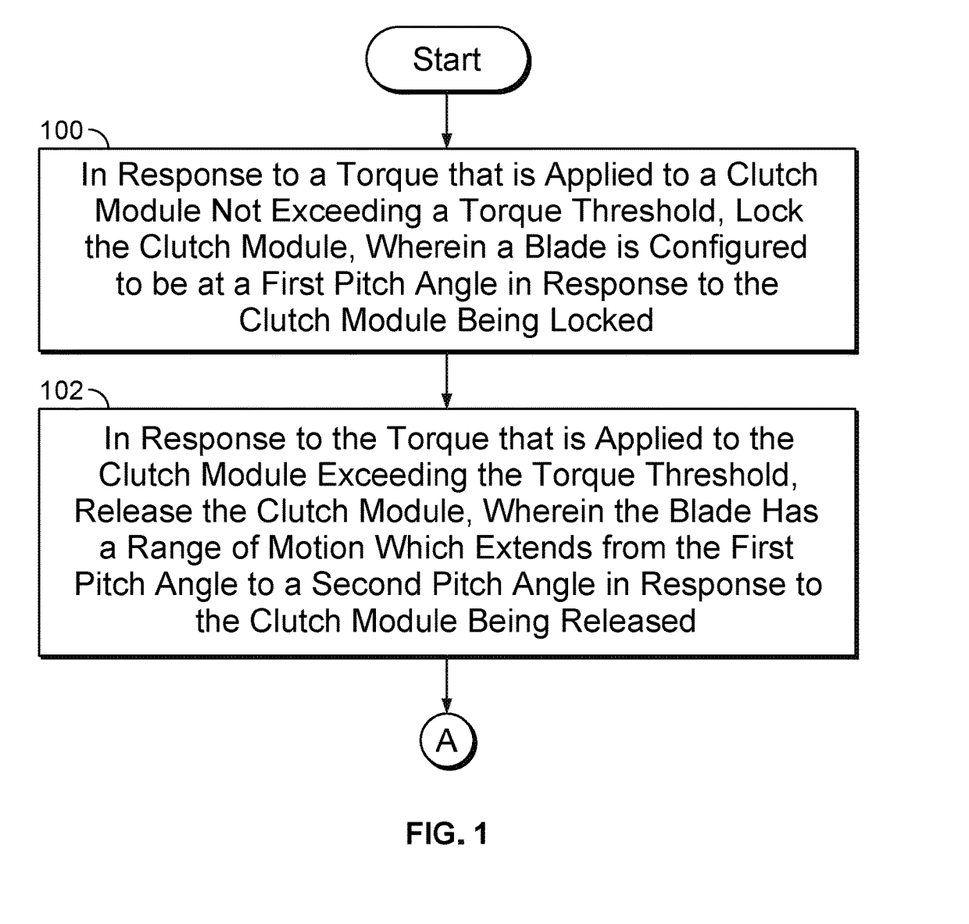
FIG. 1 is a flowchart illustrating an embodiment of a process for controlling the pitch angle of a bistable pitch propeller.

FIG. 1 is a flowchart illustrating an embodiment of a process for controlling the pitch angle of a bistable pitch propeller. In the example shown, the bistable pitch propeller includes a clutch module and a blade which is able to be held at a variety of pitch angles. For brevity and simplicity, the process of FIG. 1 recites a single blade but naturally a bistable pitch propeller may include a plurality of blades (e.g., which are configured and/or operate similarly as described in FIG. 1).

At 100, in response to a torque that is applied to a clutch module not exceeding a torque threshold, the clutch module is locked, wherein a blade is configured to be at a first pitch angle in response to the clutch module being locked. For example, the blade and the clutch module may be mechanically coupled to each other (e.g., directly or via one or more intervening modules) and when the clutch module is in the locked position, the blade is held at the first pitch angle.

In some embodiments, a clutch module includes metal balls which sit in detents (e.g., in a clutch ring). The balls in some such embodiments are held in the detents by a shifter (e.g., which sits above the balls and includes wells or cutouts on the bottom of the shifter to hold the balls from above) and by pressure from a Belleville spring. If a torque (e.g., pushing sideways or laterally on the shifter, perpendicular to the pressure from the Belleville spring) exceeds the torque threshold, then the balls will "pop" out of detents, causing at least some parts of the clutch module to rotate about an axis of rotation.

The torque which acts on the clutch module may be affected by and/or depend upon a variety of factors. For example, the bistable pitch propeller hub may be coupled to a propulsion motor which rotates the bistable pitch propeller hub (including the clutch module and blade) about a (e.g., vertical) axis of rotation. Generally speaking, only speeding up of the propulsion motor very fast and using the inertia of the blade and hub will cause the torque to spike, thus unlocking and/or release a clutch module (or, more generally, locking mechanism). The rotational speed of the blade will increase the torque due to the wind resistance of the propeller in its circumferential direction. In other words, the torque applied to a clutch module is affected by the rotation of the propulsion motor in some embodiments.

The value of the torque threshold is dictated by properties of various parts of the clutch module. An example describing the setting of the torque threshold to a desired value is described in more detail below.

In some embodiments, the locked position (i.e., first pitch angle position) associated with step 100 is a default position. For example, the clutch module may include one or more springs configured to lock the clutch module by default such that the first pitch angle is a default position of the blade.

At 102, in response to the torque that is applied to the clutch module exceeding the torque threshold, the clutch module is released, wherein the blade has a range of motion which extends from the first pitch angle to a second pitch angle in response to the clutch module being released. For example, when the clutch module is first released from the locked position, the blade is at the first pitch angle. As the next figure shows, as soon as the blade is unlocked, it wants to change its pitch angle due to thrust forces on the blade.

In some embodiments (e.g., due to different mechanical components), there is hysteresis when switching from the first pitch angle to the second pitch angle and vice versa. For example, to go from the first pitch angle and the second pitch angle, a torque acting on the clutch module may need to exceed the torque threshold. To return to the first pitch angle from the second pitch angle (e.g., where there are spring(s) which want to put the bistable pitch propeller back into the default position, which in this example is the first pitch angle), the torque acting on the clutch module just needs to drop below the pressure from the spring(s), at which point the spring(s) would cause the blade to return to the first pitch angle. Since the torque threshold does not necessarily equal the pressure from the springs, there may be hysteresis in the system.

In some embodiments there is a (e.g., intervening) pitch module which is mechanically coupled to both the clutch module and the blade. For example, when the clutch module is released or otherwise unlocked, at least part of the clutch module is permitted to rotate about a first (e.g., vertical) axis of rotation. The pitch module may mechanically translate this rotation by the clutch module about a first (e.g., vertical) axis of rotation into rotation by the blade about a second (e.g., longitudinal) axis of rotation.

It may be helpful to describe a bistable pitch propeller example and some example aircraft which may use bistable pitch propellers. The following figures describe some such examples.

Figure 2:
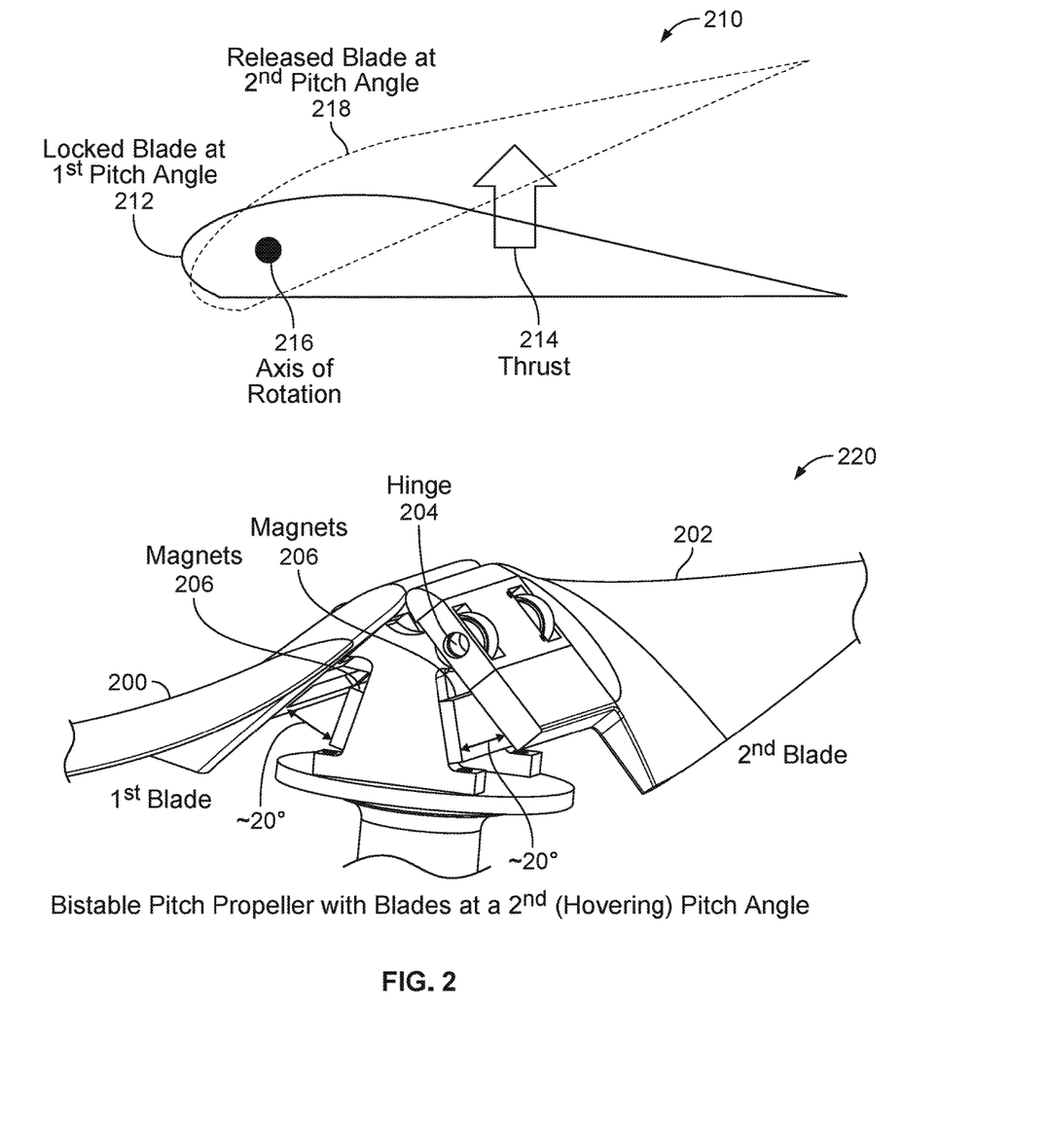
FIG. 2 is a diagram illustrating an embodiment of a bistable pitch propeller.

FIG. 2 is a diagram illustrating an embodiment of a bistable pitch propeller. In the example shown, diagram 210 shows a cross section of a single blade at two pitch angle positions. The solid cross-sectional outline (212) shows the blade in a locked state at a first pitch angle. When the clutch module is released (e.g., at step 102 in FIG. 1), the thrust (214) acting on the blade rotates the blade about the axis of rotation (216), causing the blade to immediately change its pitch angle to the second pitch angle, shown with a dotted cross-sectional outline (218).

Diagram 220 shows an example bistable pitch propeller with a first blade (200) and a second blade (202). In the state shown, the first blade (200) and the second blade (202) are both at an exemplary second pitch angle. It is noted that this figure is used to illustrate different pitch angles and does not necessarily include locking and/or holding components and/or mechanisms.

With the blades at the second pitch angle (shown), a flatter blade is presented to the relative wind. This flatter pitch angle provides more upward thrust and therefore is good for hovering (or for slow flight in any aircraft) where upward thrust is desired. In one example, the second pitch angle (shown) may be at 0 degrees and the blade tip have a twist angle of 20 to 30 degrees (e.g., the center of a propeller has a higher pitch angle than the tips as it is moving slower than the tip).

The blades (200 and 202) are attached to hinges which permit the blades to rotate between the second pitch angle (shown) and a first pitch angle. Hinge 204, which is attached to the second blade (202), shows one of these hinges (from the view shown, the hinge which is attached to the first blade is not visible). In this example, there is a difference of approximately 20° between the two pitch angles. It is noted that the hinge shown here is merely exemplary and the blades may be attached to the bistable pitch propeller and/or rotate in any manner.

If the blades were rotated to be at the first pitch angle (not shown here), then the blade pitch presented to the relative wind would be steeper. For example, the first pitch angle may be within an angular range of 20 to 30 degrees and may have a blade twist that is 30 to 50 degrees at the tip. A steeper blade pitch offers better performance for forward flight, but is not as good for hovering.

In some embodiments, one or more magnets are used to lock and/or hold the blades of the bistable pitch propeller at the first pitch angle and/or the second pitch angle. For example, magnets (206) may hold the blades more securely at the first pitch angle (not shown here) when the undersides of the metal blades (200 and 202) are touching the magnets (206).

The following figures illustrate some aircraft embodiments which use bistable pitch propellers.

Figure 3:
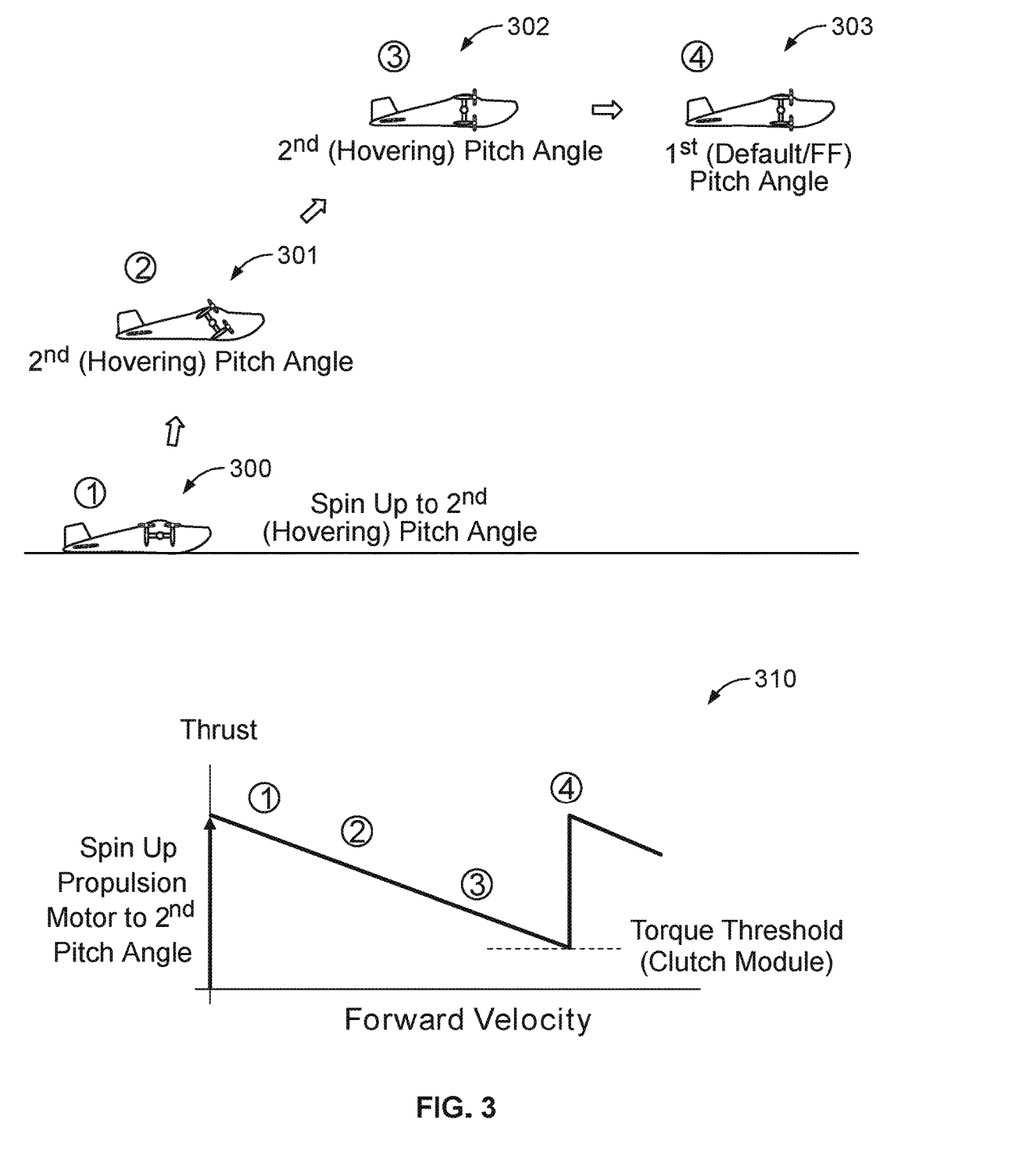
FIG. 3 is a diagram illustrating an embodiment of a manned aircraft with bistable pitch propellers mounted to rotatable wings.

FIG. 3 is a diagram illustrating an embodiment of a manned aircraft with bistable pitch propellers mounted to rotatable wings. In the example shown, diagrams 300-303 show a side view of a manned aircraft which uses bistable pitch propellers. The bistable pitch propellers are mounted to the leading edge of rotatable wings. In diagram 300, the aircraft is on the ground with the bistable pitch propellers rotating in a horizontal plane. To take off, the propulsion motor is spun up so that the blades are put into the second (hovering) pitch angle. The aircraft takes off and begins to rotate its wings (e.g., from an upwards direction to a forwards direction) while the blades are held in the second (hovering) pitch angle. See, for example, transitional diagram 301 where the wings are about halfway through their rotation. In diagram 302, the wings have completed their rotation with the blades still at the second (hovering) pitch angle. The aircraft will now fly at a substantially constant altitude. To assist with this, the blades are put into the default first pitch angle which is good for forward flight. For example, due to the flight state associated diagram 303 and/or spinning down a population motor, the torque may decrease sufficiently to permit the blades to return to the first pitch angle (e.g., using springs which push the bistable pitch propellers back into the default first pitch angle).

Diagram 310 shows a graph showing the relationship between thrust and forward velocity of the aircraft. As the aircraft takes off and progresses through the states shown in diagrams 300-302, the thrust (y-axis) decreases while the forward velocity (x-axis) increases. When the blades switch over from the second (e.g., hovering friendly) pitch angle to the first (e.g., forward flight friendly) pitch angle, the thrust increases due to the better pitch angle (e.g., for the current flight state). As shown in diagram 310, bistable pitch propellers are useful because the same propeller can be used for multiple flight modes and/or configurations where performance is optimized for the various flight modes (e.g., by changing the pitch angle). 31

The following figures describe various aspects of the above examples more formally and/or generally in flowcharts.

Figure 4:
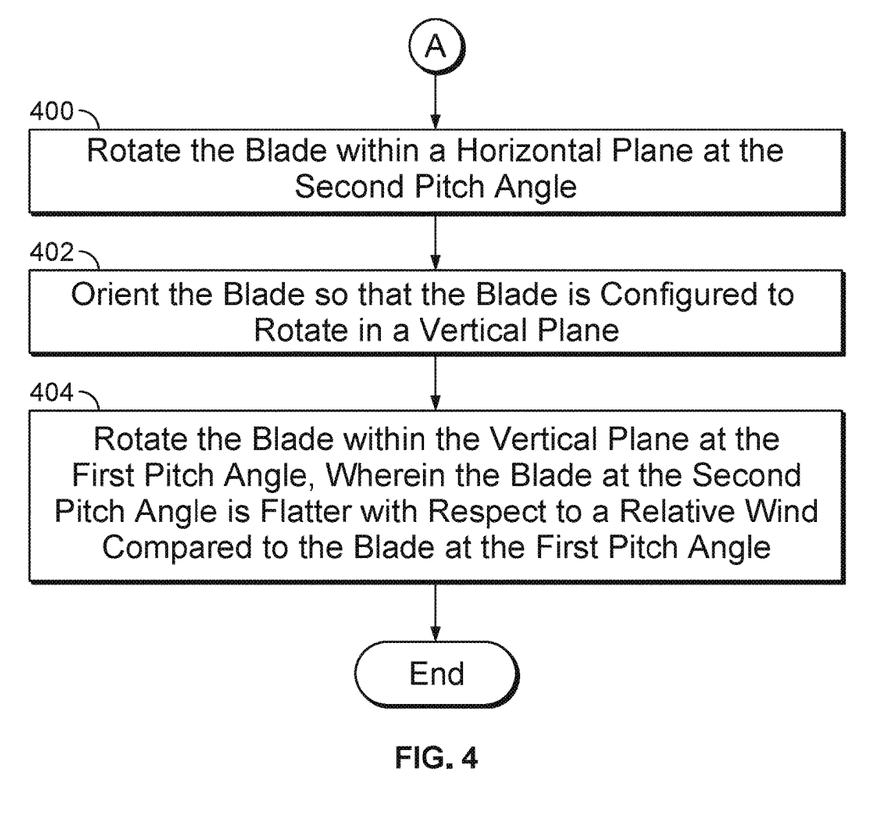
FIG. 4 is a flowchart illustrating an embodiment of a process to fly an aircraft which uses rotatable bistable pitch propellers.

FIG. 4 is a flowchart illustrating an embodiment of a process to fly an aircraft which uses rotatable bistable pitch propellers. FIG. 4 may be performed in combination with the process of FIG. 1. For example, step 100 in FIG. 1 (e.g., when the clutch module is locked and when blade is at the first pitch angle) may correspond to diagram 300 in FIG. 3 before the propulsion motor is spun up to put the blades in the second (e.g., hovering) pitch angle. Step 102 in FIG. 1 (e.g., when the clutch module is released and the blade is at the second pitch angle) may correspond to diagram 300 in FIG. 3 after the propulsion motor is spun up and the blades are in the second pitch angle.

At 400, the blade is rotated within a horizontal plane at the second pitch angle. For example, in the process of taking off in diagram 300 in FIG. 3, the bistable pitch propellers are pointing upwards so that the blades rotate in a horizontal plane.

At 402, the blade is oriented so that the blade is configured to rotate in a vertical plane. See, for example, that the wings of the aircraft in FIG. 3 rotate from pointing upwards to pointing forwards between diagrams 300-302.

At 404, the blade is rotated within the vertical plane at the first pitch angle, wherein the blade at the second pitch angle is flatter with respect to a relative wind compared to the blade at the first pitch angle. See, for example, diagram 303 in FIG. 3 and the description above about how the second pitch angle presents a flatter blade and is therefore good for hovering.

Figure 5:
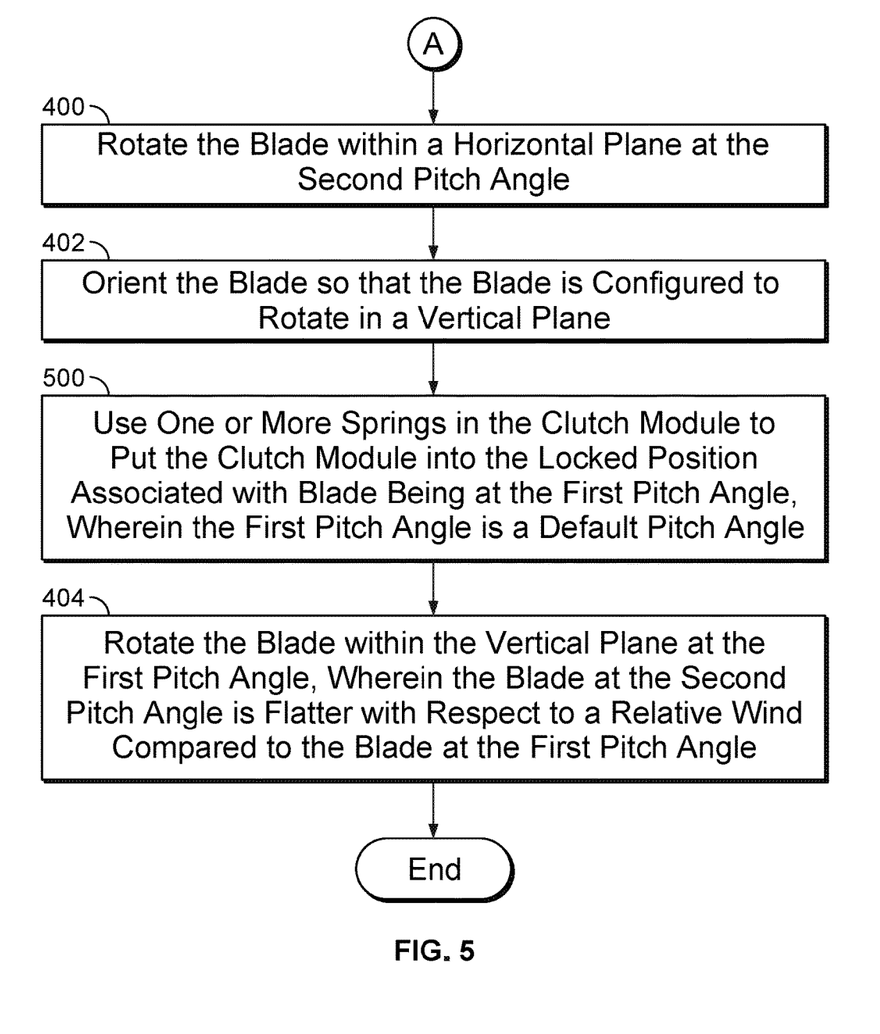
FIG. 5 is a flowchart illustrating an embodiment of a process to fly an aircraft which uses rotatable bistable pitch propellers and the first pitch angle is a default pitch angle.

FIG. 5 is a flowchart illustrating an embodiment of a process to fly an aircraft which uses rotatable bistable pitch propellers and the first pitch angle is a default pitch angle. FIG. 5 is similar to FIG. 4 and for convenience similar reference numbers are used to show similar steps.

At 400, the blade is rotated within a horizontal plane at the second pitch angle.

At 402, the blade is oriented so that the blade is configured to rotate in a vertical plane.

At 500, one or more springs in the clutch module are used to put the clutch module into the locked position associated with blade being at the first pitch angle, wherein the first pitch angle is a default pitch angle. For example, when the torque on the clutch module drops sufficiently, the springs will cause the clutch module will be put back into the locked position or state, which corresponds to the blades being at the first pitch angle. In other words, the first pitch angle is a default pitch angle which the system will tend to go to (e.g., if the system is at rest and/or no forces are acting on the system). In FIG. 4, this may correspond to using springs to put the blades into the default first pitch angle in diagram 303.

At 404, the blade is rotated within the vertical plane at the first pitch angle, wherein the blade at the second pitch angle is flatter with respect to a relative wind compared to the blade at the first pitch angle.

The following figures describe a bistable pitch propeller embodiment which includes a pitch module and a clutch module. For example, the pitch module may be an intervening module which is mechanically coupled to the clutch module as well as the blades. The pitch module may act to (e.g., mechanically) translate rotation or movement by the clutch module into rotation or movement by the blades (e.g., along or about a different axis) and vice versa.

Figure 6:
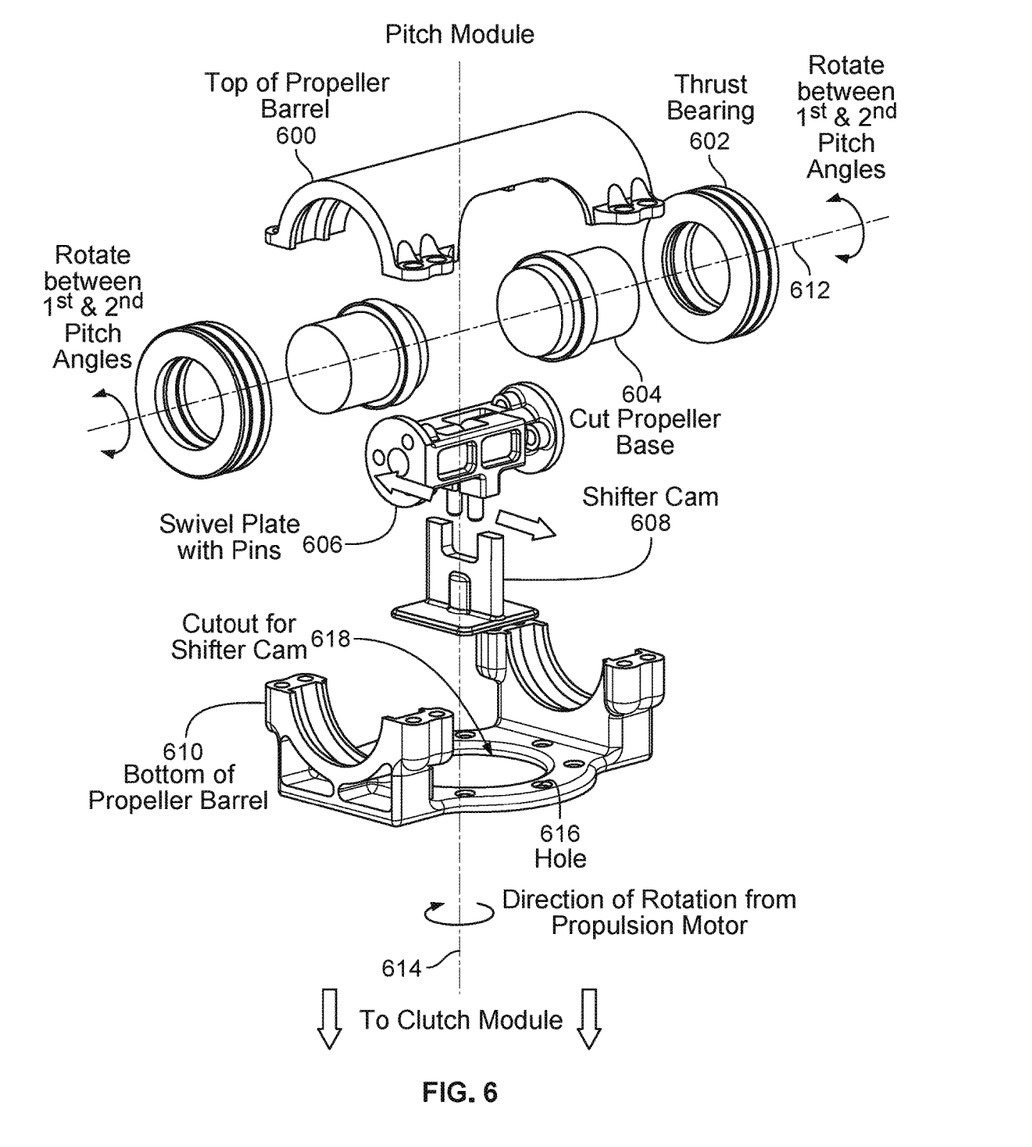
FIG. 6 is a diagram illustrating an embodiment of a pitch module.

FIG. 6 is a diagram illustrating an embodiment of a pitch module. In the example shown, the exemplary pitch module is part of a bistable pitch propeller. The pitch module shown sits on top of a clutch module (described below) and works together with the clutch module to hold the blades of the bistable pitch propeller at either a first pitch angle or a second pitch angle.

An exploded view of the pitch module is shown here to more clearly show the components in the pitch module. The pitch module includes the top of a propeller barrel (600) which is connected to the bottom of the propeller barrel (610). When connected, the top and bottom of the propeller barrel at least partially encase a thrust bearing (602), a propeller base (604), a swivel plate with pins (606), and shifter cam (608). To preserve the readability of the diagram, the propeller base (604) is shown cut so that the propeller's blades are not shown extending outward (e.g., along axis 612).

In the diagram, two axes of rotation are shown. Axis 612 (shown here as a longitudinal axis) shows the axis of rotation about which the blades of the bistable pitch propeller rotate in order to switch between the first pitch angle and the second pitch angle. Axis 614 (shown here as a vertical axis) shows the axis of rotation about which the bistable pitch propeller rotates due to a propulsion motor (not shown).

The swivel plate with pins (606) rotates when the propeller barrel (600 and 610) around it forces it to rotate about the vertical axis (614). In contrast, the shifter cam (608) does not rotate when the propeller barrel (600 and 610) rotates. As the swivel plate rotates about the vertical axis (614), some rotational positions permit the pins to be freed from the "arms" of the shifter cam. This permits the downward-facing pins to push outwards and corresponds to (and/or is mechanically coupled to) rotation of the outward-facing, circular planes about longitudinal axis 612. This rotation of the swivel plate in turn causes the (cut) propeller bases (604), and similarly the blades which are attached to the propeller bases, to also rotate about axis 612.

The following figure describes an example clutch module which corresponds to the example pitch module above.

Figure 7:
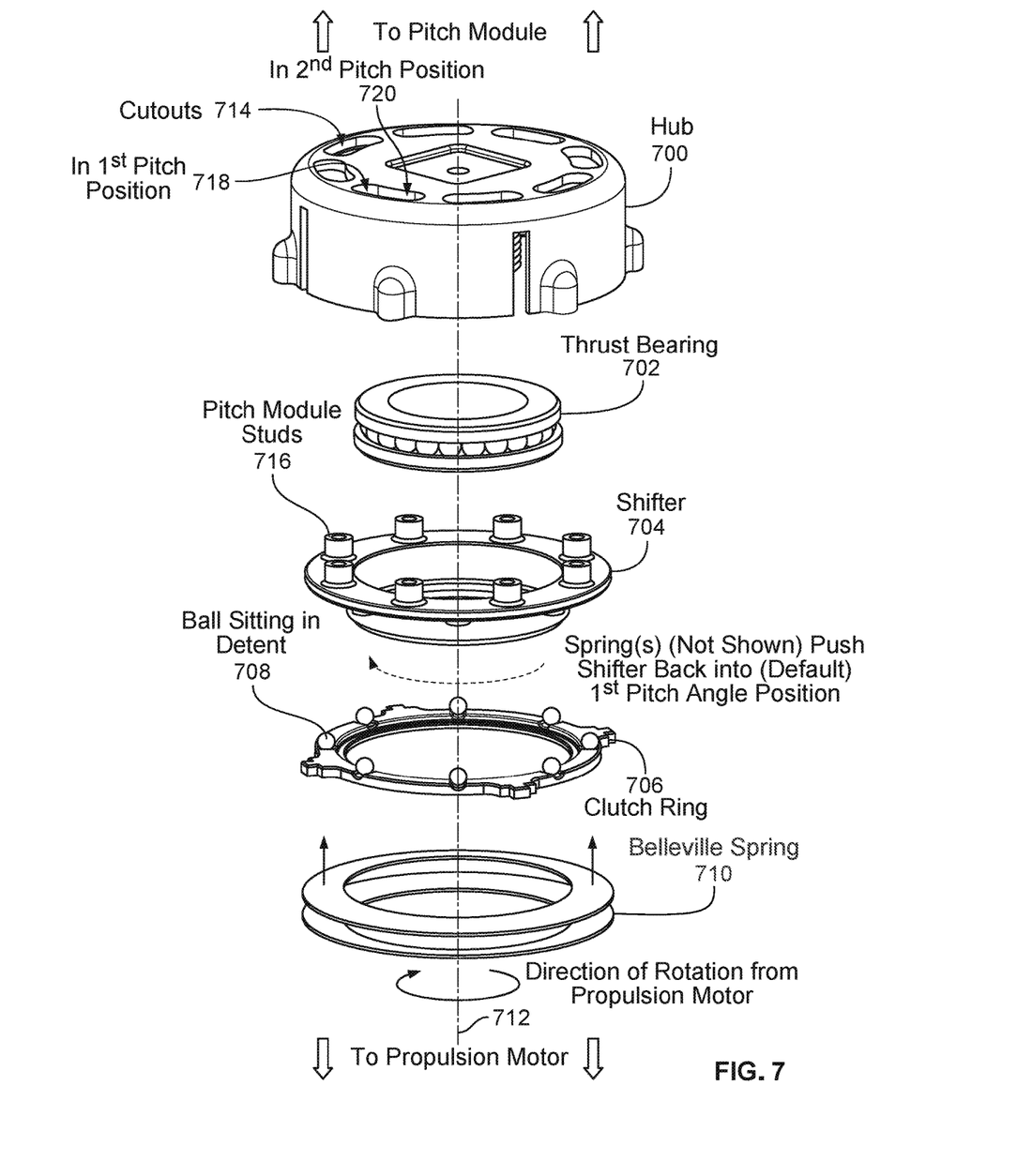
FIG. 7 is a diagram illustrating an embodiment of a clutch module.

FIG. 7 is a diagram illustrating an embodiment of a clutch module. The exemplary clutch module shown sits below the exemplary pitch module from FIG. 6 and continues the example from above. Naturally, other clutch modules may be implemented differently to work with different pitch modules.

At the top of the clutch module is a hub (700) which covers the other components shown. The bottom of the hub is fastened to the propulsion motor (not shown) beneath the Belleville spring (710).

Below the hub is a thrust bearing (702), a shifter (704), and a clutch ring (706) which has detents in which metal balls sit (708). When the components shown are connected, the tops of the balls rest inside wells on the bottom of the shifter (704). The wells are designed to be tall enough so that the balls do not roll away or otherwise escape (e.g. even when the balls pop out of the detents and roll along the top of the clutch ring).

The clutch module also includes one or more springs (not shown) which act to push the shifter back into the default first pitch angle position (e.g., where the balls are sitting in the detents). For example, if the bistable pitch propeller is at rest (e.g., with no forces or torque acting on the system), then the springs will rotate the shifter back so that the balls are sitting in the detents (which corresponds to the blades being at the first pitch angle). In the example of FIG. 4, the default (first) pitch position is one that is good for forward flight (e.g., a steeper pitch angle). Naturally, in other embodiments, the default pitch position corresponds to a pitch position that is good for hovering (e.g., a flatter pitch angle position).

Returning to FIG. 7, at the bottom of the clutch module is a Belleville spring (710). A Belleville spring is a spring in the shape of a washer and is sometimes referred to as a Belleville washer. When the components shown are connected, the Belleville spring tries to push its flat surfaces outwards (e.g., upwards and/or downwards). As the following figure shows, this sprint pressure from the Belleville spring locks the clutch module in place with the metal balls in the detents until sufficient torque is applied to dislodge the metal balls from the detents.

The torque threshold (e.g., referred to in FIG. 1) in this example depends upon the tension of the spring (e.g., which pushes the clutch module back into a default and/or locked position) and to a secondary or lesser degree on the dimensions of the metal balls and/or the depth of the detents (708). Therefore, the tension of the spring (and to a lesser degree, the dimensions of the metal balls and/or the detents) may be adjusted to set the torque threshold to a desired value.

The pitch module studs (716) which are exposed by the cutouts (714) of the hub are connected to the bottom of the pitch module from FIG. 6. For example, note the holes (616) arranged in a circle at the base of the bottom of the propeller barrel (610) in FIG. 6. Screws or bolts may be passed through the holes (e.g., 616 in FIG. 6) and fastened to the pitch module studs (716 in FIG. 7).

To more clearly illustrate how the pitch module and clutch module operate, it may be helpful to consider the following table which shows which components move when switching between the first pitch angle and the second pitch angle. Movement in this table does not take into consideration rotational movement due to the propulsion motor (e.g., because the propulsion motor causes all of the components in the pitch module and clutch module to rotate). To put it another way, the movement in this table considers relative movement, not absolute movement.

TABLE 1

(Relative) movement of components in the pitch module and clutch module when switching between the first pitch angle and the second pitch angle.

| Component | Module | Moves when changing pitch angle? |
| --- | --- | --- |
| Propeller barrel | Pitch module | Yes |
| Thrust bearing | Pitch module | Yes |
| Propeller base | Pitch module | Yes |
| Swivel plate | Pitch module | Yes |
| Shifter cam | Pitch module | No |
| Hub | Clutch module | No |
| Thrust bearing | Clutch module | Yes |
| Shifter | Clutch module | Yes |
| Metal balls | Clutch module | Yes |
| Clutch Ring (with detents) | Clutch module | No |
| Belleville spring | Clutch module | No |

The following figure shows the clutch module when in a locked position or state and when in a released position or state.

Figure 8:
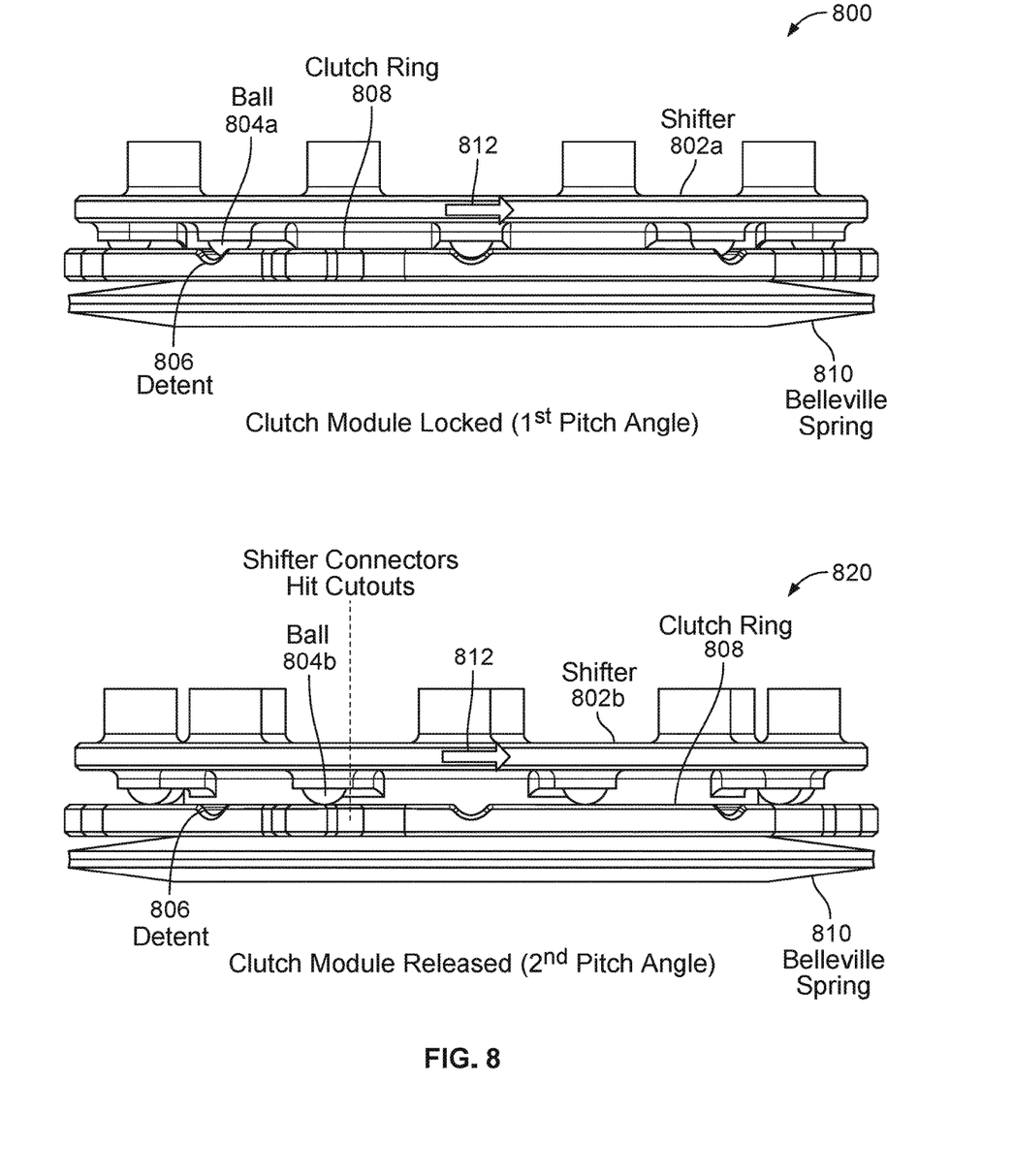
FIG. 8 is a diagram illustrating an embodiment of a clutch module when in a locked position or state and when in a released position or state.

FIG. 8 is a diagram illustrating an embodiment of a clutch module when in a locked position or state and when in a released position or state. To preserve the clarity and readability of the diagrams, some clutch module components shown in the previous figure are not shown here. With respect to FIG. 1, diagram 800 shows an example of step 100 and diagram 820 shows an example of step 102.

Diagram 800 shows the clutch module in a locked position corresponding to the blade(s) (not shown) being at the first pitch angle. In the position shown, each of the metal balls sits in a corresponding detent in the clutch ring (808). When ball 804a is sitting in detent 806, the clutch module and pitch module act to position the blades of the bistable pitch propeller at a first pitch angle.

The Belleville spring (810) expands outwards (e.g., vertically in this diagram), pushing the clutch ring (808), metal balls (including ball 804a), and shifter (802a) together. This pressure from the Belleville spring, combined with the metal balls sitting in the detents of the clutch plate, holds the clutch module in the locked position shown until sufficient torque (812) is applied to the shifter. For example, this torque (812) comes from aerodynamic force on the blades of the bistable pitch propeller given the current flight state and/or rotational speed of the propulsion motor. As the torque increases, it will eventually be sufficient to "pop" the metal balls out of their detents. Until then, the clutch module (and thus the bistable pitch propeller) remains locked in a position corresponding to the first pitch angle.

Diagram 820 shows the clutch module when released and in a position that corresponds to blade(s) being at the second pitch angle. Ball 804b is the same ball as ball 804a in diagram 800 but with a different position. Note that shifter 802b in diagram 820 has also rotated relative to shifter 802a in diagram 800. For example, torque 812 has caused the balls to pop out of their detents and the shifter to rotate to the position shown.

The ball (804b) and shifter (802b) are stopped from rotating further by the pitch module studs hitting the ends of cutouts of the hub. For example, in FIG. 8, this corresponds to pitch module studs 816 hitting cutout end 820.

Returning to diagram 820, when the torque (812) decreases sufficiently, one or more springs (not shown) acting on the shifter (802b) will cause the shifter to rotate back to the locked position or state shown in diagram 800. As described above, the torque thresholds or levels at which the system goes from the first pitch angle to the second pitch angle and vice versa are not necessarily the same and in some embodiments a system has hysteresis.

As shown here, the clutch module may lock by pushing one or more balls into one or more detents using a Belleville spring. Correspondingly, the clutch module may release by lifting (e.g., pushing them up a 45° ramp) the ball(s) out of the detent(s).

The following figures describe various aspects of the above examples more formally and/or generally in flowcharts.

Figure 9:
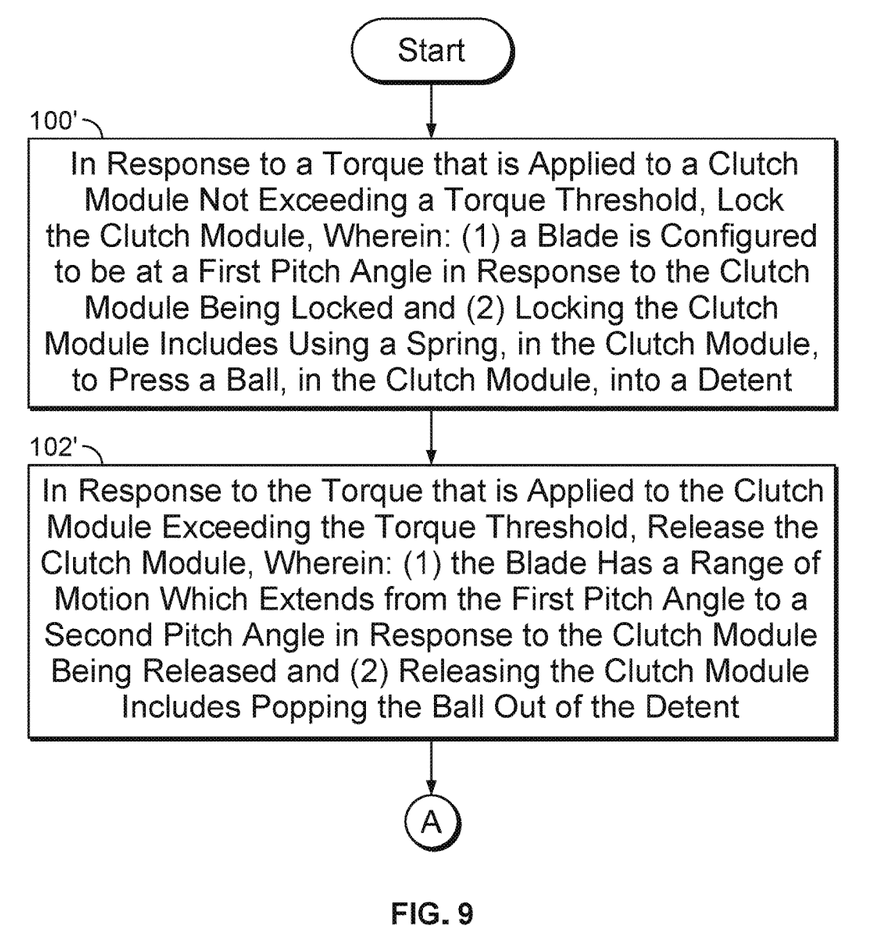
FIG. 9 is a flowchart illustrating an embodiment of a process for controlling the pitch angle of a bistable pitch propeller using balls and detents to lock a clutch module.

FIG. 9 is a flowchart illustrating an embodiment of a process for controlling the pitch angle of a bistable pitch propeller using balls and detents to lock a clutch module. FIG. 9 is similar to FIG. 1 and for convenience similar reference numbers are used to show similar steps.

At 100', in response to a torque that is applied to a clutch module not exceeding a torque threshold, the clutch module is locked, wherein: (1) a blade is configured to be at a first pitch angle in response to the clutch module being locked and (2) locking the clutch module includes using a Belleville spring, in the clutch module, to press a ball, in the clutch module, into a detent. See, for example, the locked state shown in diagram 800 in FIG. 8.

At 102', in response to the torque that is applied to the clutch module exceeding the torque threshold, the clutch module is released, wherein: (1) the blade has a range of motion which extends from the first pitch angle to a second pitch angle in response to the clutch module being released and (2) releasing the clutch module includes popping the ball out of the detent. See, for example, the released state shown in diagram 820 in FIG. 8.

The following figures show some other pitch module and/or clutch module embodiments. Features and/or mechanical components described herein may be used together in any desired combination.

Figure 10:
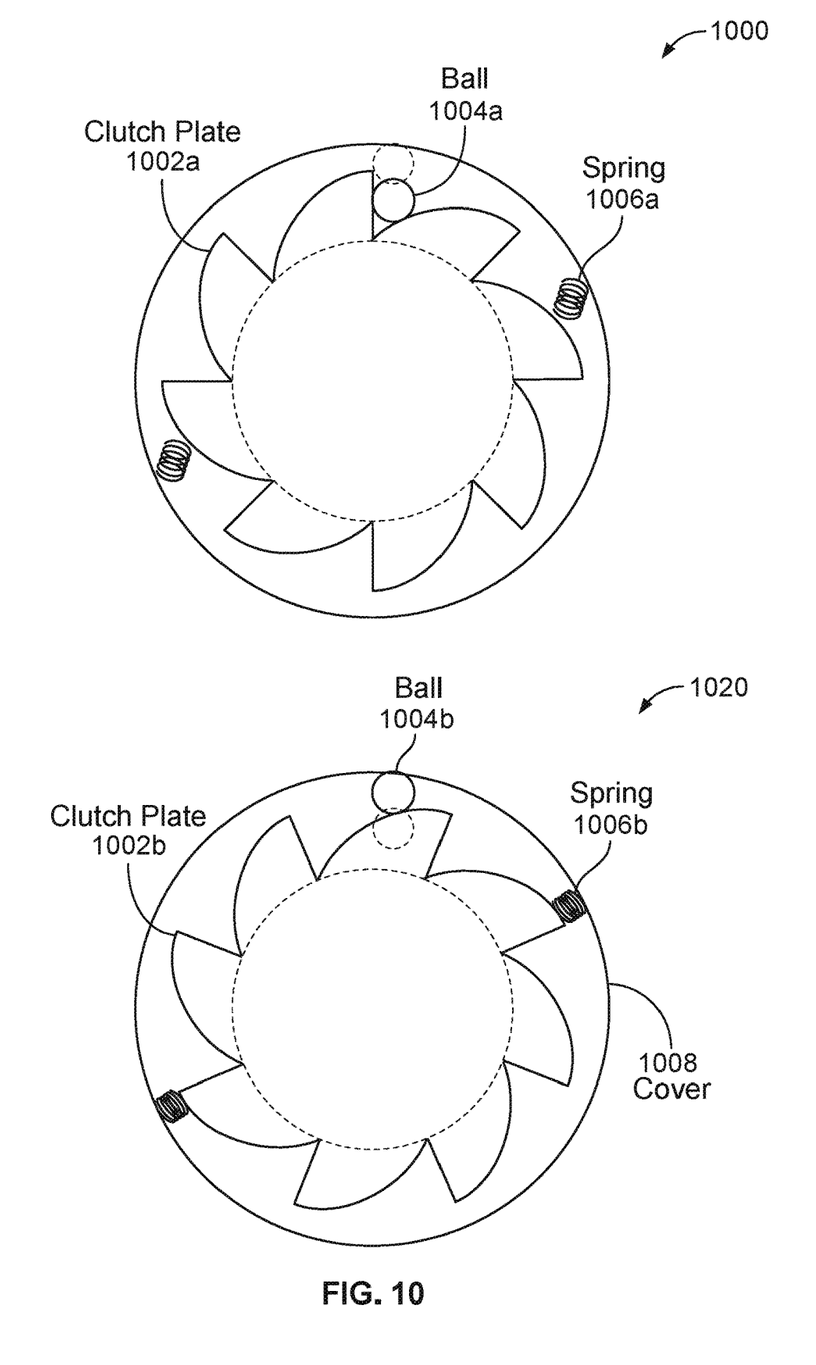
FIG. 10 is a diagram illustrating an embodiment of a clutch module with curved detents.

FIG. 10 is a diagram illustrating an embodiment of a clutch module with curved detents. In the example shown, diagram 1000 shows the clutch module in a locked position or state (e.g., corresponding to one of the pitch angles). The ball (1004a) is sitting in a curved detent in the clutch plate (1002). Although only a single ball is shown here, each of the detents may have a corresponding ball. The clutch in this example is able to rotate and a spring (1006a) wants to push the clutch plate in the clockwise direction (e.g., towards a default, locked state). A variety of (e.g., mechanical) stoppers may be used to prevent the clutch plate from rotating clockwise further (e.g., beyond the position shown in diagram 1000).

Torque (e.g., received from the blades of the bistable pitch propeller) may cause the clutch plate to rotate in the counterclockwise direction, releasing the clutch module. Diagram 1020 shows the clutch module after this rotation and/or release and corresponds to the other pitch angle. Note, for example, that the position of the clutch plate (1002b) in diagram 1020 is different compared to the position of the clutch plate (1002a) in diagram 1000, and that the spring (1006b) has compressed due to the rotation of the clutch plate.

Another change in diagram 1020 is that the ball (1004b) has shifted radially outward so that it is now pressed between the rounded edge of the detent in the clutch plate and the inside of the cover (1008). Note that the position of ball 1004a in diagram 1000 is different from that of ball 1004b in diagram 1020. Dashed outlines show the position of the ball in the other diagram. The position of the ball (1004b) in diagram 1020 prevents the clutch plate from rotating clockwise further, acting as a mechanical stopper to prevent further rotation.

In some embodiments, a clutch plate (not shown here) sits above the balls and ensures that balls can only move in the manner shown here (e.g., move radially inwards or radially outwards).

Although this example shows a rotatable clutch plate, in some embodiments, the clutch plate is fixed and the balls roll up/down the rounded edge of the detents.

Figure 11:
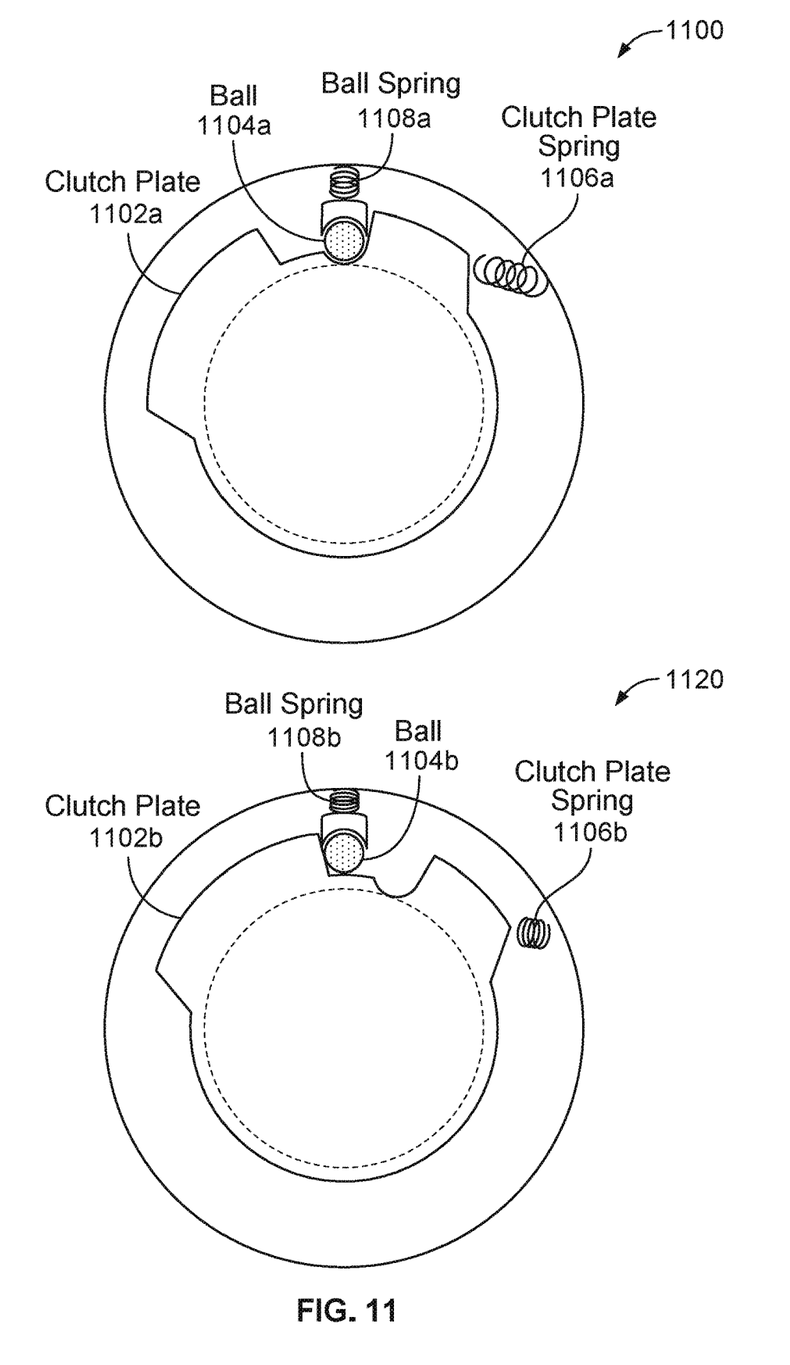
FIG. 11 is a diagram illustrating an embodiment of a clutch module with spring-loaded balls.

FIG. 11 is a diagram illustrating an embodiment of a clutch module with spring-loaded balls. In the example shown, diagram 1100 shows the clutch module in a locked position or state and corresponds to one of the pitch angles. The ball (1104a) sits in a detent in the clutch plate (1102a). The detent is part of a cutout in the clutch plate and which also includes a (slightly) elevated portion of the cutout (e.g., where the ball sits when the clutch plate is released). Although only a single ball and a single cutout are shown, a clutch plate may include any number of balls/cutouts.

In this example there are two springs: a ball spring (1108a) and a clutch plate spring (1106a). The ball spring pushes radially inwards on the ball and in the state shown in diagram 1100 pushes the ball into the detent. The clutch plate spring wants to rotate the clutch plate in the counterclockwise direction, for example so that the system returns to a default state or position where the ball rests in the detent. Diagram 1120 shows the clutch module in a released position or state and corresponds to the other pitch angle. The clutch plate (1102b) has rotated in the clockwise direction such that the ball (1104b) has popped out of the detent and is sitting in the (slightly) elevated portion of the cutout. Note that both the ball spring (1108b) and clutch plate spring (1106b) are compressed in this diagram due to the movement of the ball and rotation of the clutch plate, respectively.

Note that the ball spring (1108a/1108b) shown here which pushes the ball radially inwards into the detent is one example of a spring used at step 100' in FIG. 10. In other words, step 100' is not restricted to a Belleville spring or any specific type of spring for that matter.

Figure 12:
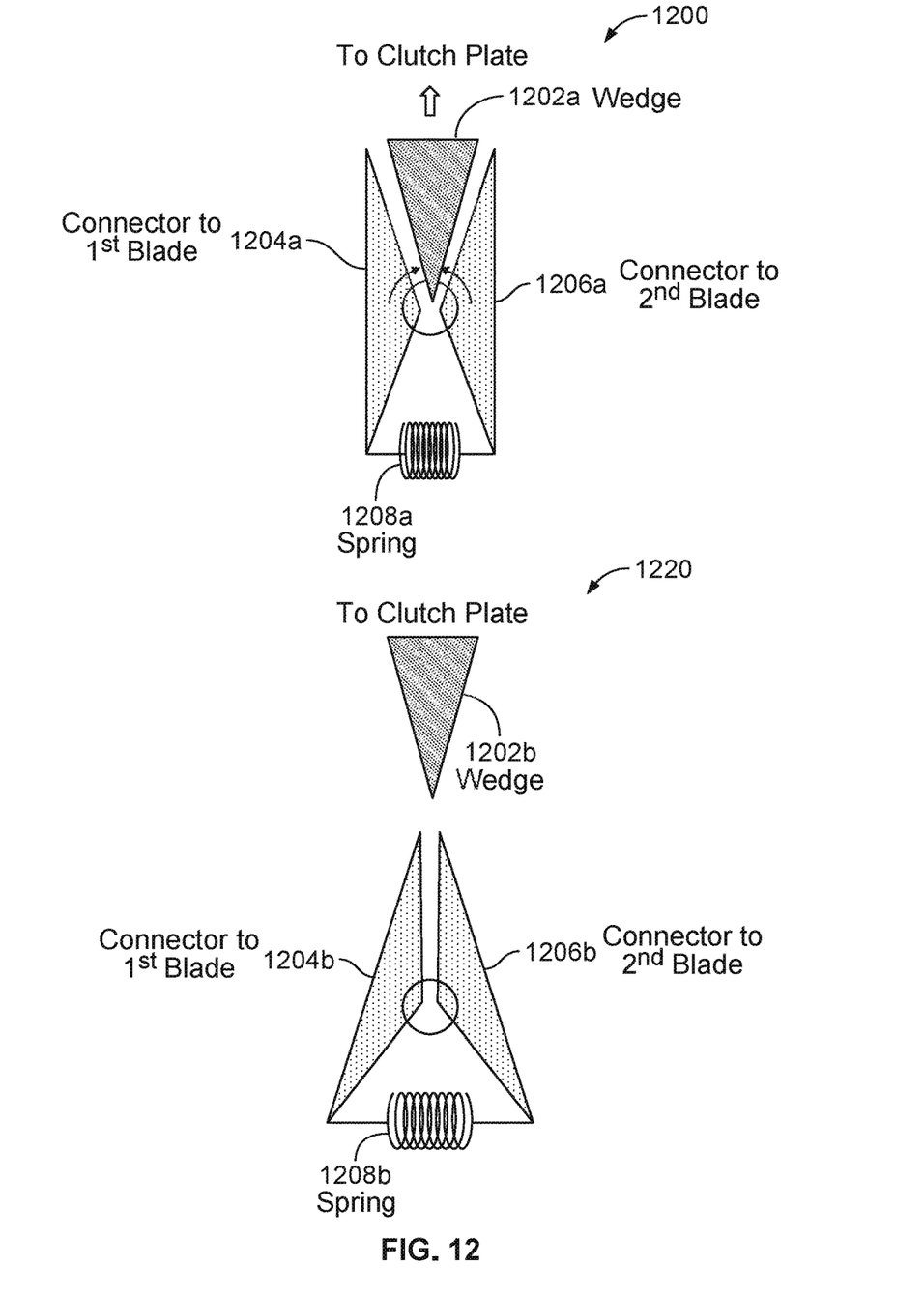
FIG. 12 is a diagram illustrating an embodiment of a pitch module with a wedge and spring.

FIG. 12 is a diagram illustrating an embodiment of a pitch module with a wedge and spring. Diagram 1200 shows the pitch module at a position corresponding to one of the pitch angles. In the state shown, a wedge (1202a) separates two connectors (1204a and 1204b). The wedge is mechanically coupled or connected to the clutch plate, which moves the wedge up/down. The connectors are connected to the first blade and the second blade. The connectors are able to rotate about a pivot point or hinge and the rotation of the connectors is mechanically translated into rotation of the blades (e.g., to switch the blades between the first pitch angle and the second pitch angle). A spring (1208a) attempts to rotate the connectors but the wedge keeps the connectors from rotating.

Diagram 1220 shows the pitch module once the wedge (1202b) has been moved upwards (e.g., by the clutch plate) which permits the connector to the first blade (1204b) and the connector to the second blade (1206b) to rotate in a clockwise and counterclockwise direction, respectively, due to the spring (1208b) pushing on the connectors. Note that the spring (1208b) shown in diagram 1220 has expanded compared to the compressed spring (1208a) shown in diagram 1200. Diagram 1220 shows the pitch module at a position corresponding to the other pitch angle.

To return to the state shown in diagram 1200, the clutch plate may cause the wedge (1202b) to be pushed down. The wedge is then able to slip between the two connectors (1204b and 1206b) and separate them, pushing against the spring (1208b) and returning the system to the state shown in diagram 1200.

As shown here, in response the wedge separating the first connector and the second connector, the first blade and the second blade are rotated to be at the first pitch angle. For example, putting the connectors into the position or state shown in diagram 1200 would cause the blades to be put (e.g., rotated) into the first pitch angle. In response to the spring pushing the first connector and the second connector together when the wedge does not separate the first connector and the second connector, the first blade and the second blade are rotated to be at the second pitch angle. For example, putting the connectors into the position or state shown in diagram 1220 would cause the blades to be put into the second pitch angle. In some embodiments, diagram 1200 is associated with the second pitch angle and diagram 1220 is associated with the first pitch angle.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A bistable pitch propeller, comprising:
   a ball;
   a spring;
   a clutch module, wherein:
      the clutch module has a range of rotational movement between a locked end position and a released end position;
      the clutch module includes a detent, the ball sits in the detent when the clutch module is in the locked end position, and the ball sits outside of the detent when the clutch module is in the released end position;
      the clutch module rotates toward the released end position in response to an input torque; and
      the clutch module rotates toward the locked end position in response to a spring force from the spring; and
   an aircraft blade, wherein:
      the aircraft blade has a range of rotational movement between a first pitch angle and a second pitch angle;
      the aircraft blade is mechanically coupled to the clutch module;
      the aircraft blade is at the first pitch angle when the clutch module is in the locked end position; and
      the aircraft blade is at the second pitch angle when the clutch module is in the released end position.

2. The bistable pitch propeller recited in claim 1, wherein the detent is located on a planar surface of the clutch module that is perpendicular to the axis of rotation of the clutch module.

3. The bistable pitch propeller recited in claim 1, wherein the detent is located on a non-planar surface of the clutch module.

4. The bistable pitch propeller recited in claim 1, wherein:
   the detent is located on a non-planar surface of the clutch module; and
   the detent includes a curved detent which includes a curved surface that the ball rolls up as the clutch module rotates toward the released end position.

5. The bistable pitch propeller recited in claim 1, wherein:
   the detent is located on a non-planar surface of the clutch module;
   the detent includes a curved detent which includes a curved surface that the ball rolls up as the clutch module rotates toward the released end position; and
   the clutch module is stopped at the released end position when the ball is pressed between an inside of a cover and the curved surface of the detent.

6. The bistable pitch propeller recited in claim 1, wherein:
   the detent is located on a non-planar surface of the clutch module; and
   the spring is a clutch plate spring; and
   the bistable pitch propeller further includes a ball spring which pushes the ball radially inward towards the center of the clutch module.

* * * * *